United States Patent Office 3,499,843
Patented Mar. 10, 1970

3,499,843
CATHODOLUMINESCENT PHOSPHORS
Jesse J. Brown, Jr., Towanda, and Bryce W. Van Noy, Troy, Pa., assignors to Sylvania Electric Products Inc., a corporation of Delaware
Filed Dec. 19, 1966, Ser. No. 602,887
Int. Cl. C09k 1/68
U.S. Cl. 252—301.4   3 Claims

ABSTRACT OF THE DISCLOSURE

A series of green emitting, cathodoluminescent magnesium aluminate gallate phosphors activated by manganese.

BACKGROUND OF THE INVENTION

Field of the invention

Figure 1:
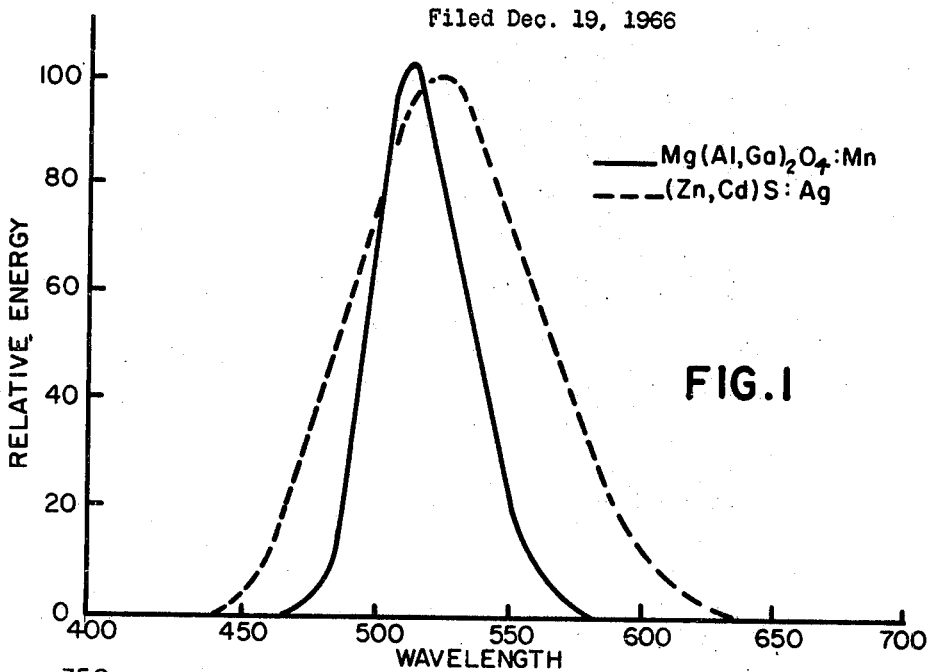

This invention relates to luminescent materials and particularly to a series of manganese-activated magnesium aluminate gallate cathodoluminescent phosphors.

One application of the phosphors of this invention is in color cathode ray tubes as the green component, particularly in color television tubes. These tubes usually employ at least one electron gun and a related viewing panel having a cathodoluminescent screen responsive to electron impingement disposed upon a surface thereof. Such a screen generally includes a plurality of discrete phosphor patterns consisting of elements such as bars, strips, or dots in groups of three. In response to electron beam excitation, each element emits light of one of the primary colors; red, green and blue.

A screen of this type may be fabricated by a conventional photographic printing technique wherein a photosensitive material is utilized to bind the color-emitting phosphors to the viewing panel. In such a process, the viewing panel is first coated with a thin film of a photosensitive substance such as sensitized polyvinyl alcohol and a specific color-emitting phosphor. One method of coating is to first deposit a film of the photosensitive substance on the panel and then dispose a phosphor powder thereupon as by the well-known dusting porcedures. Another method is to apply a suspension of phosphor to a panel coated with a resin which is then exposed to ultraviolet light through an appropriately patterned negative or aperture mask whereby the photosensitive substance is polymerized or hardened and adheres in accordance with the patterned negative exposure, thus concurrently binding the respective phosphor particles. The portions of the screen which were not exposed to the light are subsequently removed by dissolving the unpolymerized resin with a suitable solvent. This procedure is repeated for the disposition of each color-emitting phosphor pattern of the screen; the sequential order of color disposition not being critical. A subsequent bakeout eliminates the volatile ingredients leaving the phosphor-patterned screen as a completed unit of the tube structure.

For usage in compatible cathodoluminescent screen combination, the particular color phosphor materials are selected with reference to certain aspects of color characteristics, such as hue, degree of saturation and brightness. In a color cathode ray tube, as employed in a television receiver, it is desirable to have a cathodoluminescent phosphor screen combination that will produce a balanced white color upon simultaneous beam bombardment of the several phosphors contained therein. The cathodoluminescent white, as produced in a color cathode ray tube, is the result of the combined luminous emission of all of the phosphors on the screen in accordance with a predetermined relationship of their various respective luminous characteristics.

In an endeavor to achieve this desired luminescent relationship, various color-emitting phosphor materials, selected for their contributing and compatible color qualities, are suitably disposed as patterned groups in a common screen.

Many characteristics of a phosphor must be considered when selecting one which will produce a color screen. One of the more important considerations is luminous efficiency when the material is excited by cathode rays. If one of the phosphors in the screen is not sufficiently bright, an intentional adjustment or reduction in the luminescence of the associated brighter phosphors is necessitated to approximate more nearly the brightness of the less efficient phosphors of the screen combination. Such a compromising procedure can reduce the level of overall screen brightness. Other techniques for adjusting the imbalance in brightness between various phosphors in the system can be achieved by either milling or introducing small amounts of luminescent quenchers into the matrix of the brighter phosphors.

Other characteristics to be considered in the selection of a phosphor are maintenance and decay. If one of the phosphors in the group loses its luminous efficiency too quickly, it is not suitable even if it is a very bright material. Such loss not only results in a screen of diminished brightness, but also the color balance between the various phosphors will be shifted upon use. Similarly, a suitable cathodoluminescent phosphor will have little or no afterglow when the cathode ray bombardment is ceased.

Additionally, the body color characteristics of the material are important since the phosphor should have a white color so as to reflect, and not absorb the emission of adjacent phosphors. The phosphor should also be easy to handle since the coating operation described above requires freely flowing particles within particular size ranges.

SUMMARY OF THE INVENTION

We have discovered that these characteristics are fulfilled by manganese-activated phosphors prepared throughout the crystalline solution series that exists between magnesium gallate and magnesium aluminate. These phosphors emit in the green region of the visible spectrum when bombarded by cathode rays, they have a white body color, their efficiency is comparable to conventional green cathodoluminescent phosphors, and their saturation, decay and particle size can be varied between wide limits by altering the composition and/or preparation techniques.

FIGURE 1 shows the cathodoluminescent spectral energy distributions and relative emission energies of one phosphor of the present invention and a conventional zinc cadmium sulfide phosphor activated by silver. The peak intensity of the magnesium aluminate gallate phosphor is larger than that of the zinc cadmium sulfide phosphor, but the overall light output for the sulfide is much larger because of its wider emission band. Because of the increased degree of saturation of the phosphor of the present invention, its total light output does not need to be as large as that of the zinc cadmium sulfide phosphor to produce an equivalent cathodoluminescent white color in a tridot system.

According to the present invention, the magnesium aluminate gallate phosphors have the spinel crystal structure. This composition range can be described by the general formula $Mg_xAl_yGa_{2-y}O_{3+x+z}:Mn_z$ where $x$ is between 0.25 to 1.10 moles, $y$ is between about 0.001 to 2.0 moles and $z$ is between 0.0001 to 0.1 mole.

Phosphors prepared within the limits described above (Examples A, B, C, D, E, and F of Table I following) have the following characteristics: (a) peak wavelengths which vary from 522 nm. to 554 nm., (b) chromaticity coordinates varying from $x=0.194$, $y=0.734$ for $MgAl_2O_4$:Mn to $x=0.084$, $y=0.603$ for $MgGa_2O_4$:Mn, (c) decay to 1% of original brightness from 23 to 98 milliseconds, and (d) total brightness ranging up to 19.0 ft.-l. These characteristics, along with particle size variations governed by preparation techniques, enable these phosphors to be prepared so that they are compatible with almost any phosphor system in existence.

One mole $MgCO_3$, one mole $Ga_2O_3$, and one mole $Al_2O_3$, are thoroughly blended with 0.01 mole of $MnCO_3$, or any other well-known manganese salt. The resulting mixture is fired at 1400° C. for 8 hours in air, pulverized, and re-heated at 1200° C. for 1 hour in 2%$H_2$-98%$N_2$ gas atmosphere. After the powder is carefully cooled in a protective atmosphere, an efficient green phosphor is obtained. Although this procedure was especially successful, it was found that both heat treatments could be varied considerably, e.g., 900 to 1600° C. and ½ to 24 hours.

TABLE I

| Example | Composition (mole percent) | | | Peak wavelength (nm.) | Chromaticity coordinates | | Time in milliseconds to decay to 1% of original brightness | Brightness (ft.-l.) |
| --- | --- | --- | --- | --- | --- | --- | --- | --- |
| | $MgAl_2O_4$ | $MgGa_2O_4$ | $MnGa_2O_4$ | | x | y | | |
| (A) | 99 | | 1 | 522.0 | 0.194 | 0.734 | 98 | 8.9 |
| (B) | 79 | 20 | 1 | 518.0 | 0.164 | 0.735 | 85 | 12.1 |
| (C) | 59 | 40 | 1 | 514.0 | 0.141 | 0.718 | 60 | 19.0 |
| (D) | 40 | 59 | 1 | 511.0 | 0.106 | 0.688 | 30 | 16.5 |
| (E) | 20 | 79 | 1 | 507.0 | 0.096 | 0.651 | 25 | 11.5 |
| (F) | | 99 | 1 | 504.0 | 0.084 | 0.603 | 23 | 6.8 |
| (Zn,Cd)S:Ag | | (¹) | | 540–560 | 0.285 | 0.573 | 6.8 | 59–64 |

¹ Standard phosphor.

Figure 2:
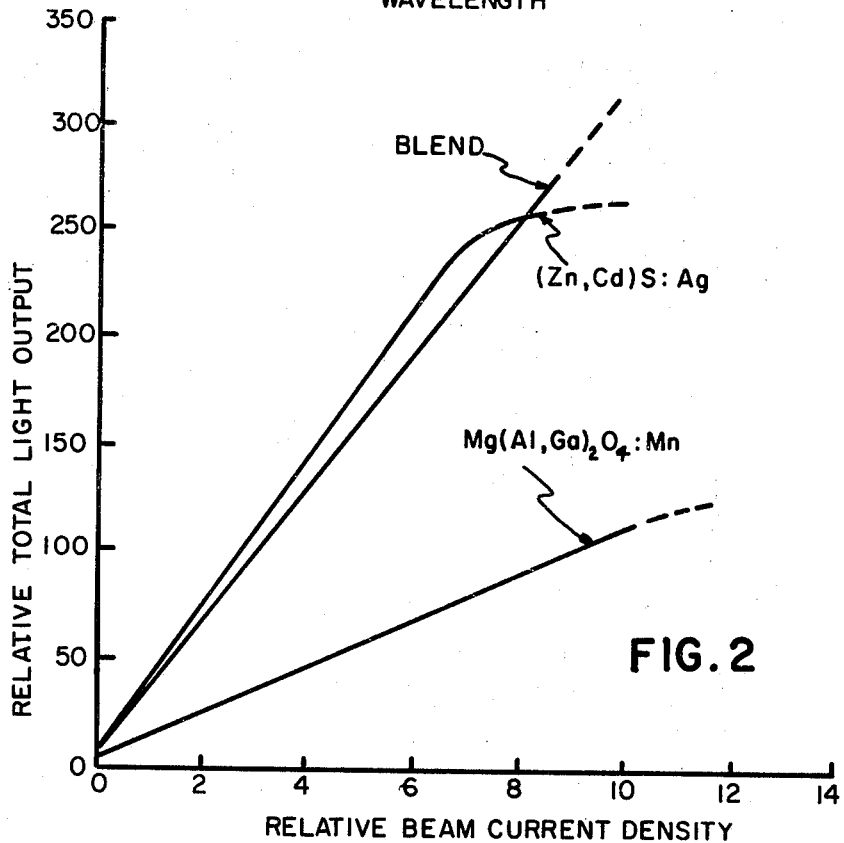

Another important characteristic of the phosphors of the present invention is their tracking behaviors especially when used in a blend with other phosphors. When a beam current is increased, the brightness of the irradiated phosphor increases more or less linearly up to a point. When no further increase in brightness occurs when the beam current is increased, the phosphor is said to have become saturated and the characteristics of the curve are known as tracking behavior. FIGURE 2 shows typical tracking curves for a typical green-emitting sulfide, a magnesium aluminate gallate, and a 1:1 blend of these two phosphors. The blend is especially useful because it takes advantage of the improved chromaticity coordinates and tracking qualities of the magnesium aluminate gallate and of the brightness of the sulfide. As seen, the blend is increasing linearly at relative beam current density of about 9 while both of the components have plateaued.

A specific example of the preparation of a phosphor in accordance with the present investigation is given below:

As our invention, we claim:

1. A cathodoluminescent magnesium aluminate gallate phosphor having the formulation $$Mg_xAl_yGa_{2-y}O_{3+x+z}:Mn_z$$

wherein $x$ is between about 0.25 and 1.10 and $y$ is between about 0.001 and 1.58 and $z$ is between about 0.0001 and 0.1

2. The composition according to claim 1 wherein the host lattice has a spinel crystal structure.

3. The composition according to claim 2 wherein the material has a green emission when excited by cathode rays.

References Cited

UNITED STATES PATENTS 3,396,119   8/1968   Maiman et al.  252—301.4

FOREIGN PATENTS 465,210   5/1950   Canada.

ROBERT D. EDMONDS, Primary Examiner